US011260562B2

(12) United States Patent
Schoneveld et al.

(10) Patent No.: US 11,260,562 B2
(45) Date of Patent: Mar. 1, 2022

(54) METHOD FOR MANUFACTURING A SLAB

(71) Applicant: Innovative Stone Technologies B.V., Amsterdam (NL)

(72) Inventors: Erik Schoneveld, Amsterdam (NL); Arend Kuindert Van Helden, Amsterdam (NL); Laurens Wouter Van Graafeiland, Amsterdam (NL)

(73) Assignee: INNOVATIVE STONE TECHNOLOGIES B.V., Amsterdam (NL)

( * ) Notice: Subject to any disclaimer, the term of this patent is extended or adjusted under 35 U.S.C. 154(b) by 338 days.

(21) Appl. No.: 16/470,369

(22) PCT Filed: Dec. 15, 2017

(86) PCT No.: PCT/NL2017/050841
§ 371 (c)(1),
(2) Date: Jun. 17, 2019

(87) PCT Pub. No.: WO2018/111106
PCT Pub. Date: Jun. 21, 2018

(65) Prior Publication Data
US 2019/0329458 A1    Oct. 31, 2019

(30) Foreign Application Priority Data
Dec. 16, 2016   (NL) ..................... 2018010

(51) Int. Cl.
*B29C 37/00* (2006.01)
*B28B 1/00* (2006.01)
*B28B 5/02* (2006.01)
*B29C 67/24* (2006.01)

(52) U.S. Cl.
CPC .......... *B29C 37/0064* (2013.01); *B28B 1/005* (2013.01); *B28B 5/021* (2013.01); *B29C 67/245* (2013.01)

(58) Field of Classification Search
CPC ..... B28B 5/021; B29C 67/243; B29C 70/025; B32B 13/14
See application file for complete search history.

(56) References Cited

U.S. PATENT DOCUMENTS

| 3,615,963 | A | * | 10/1971 | Johansson | ............... E04F 13/18 156/62.2 |
| 4,210,774 | A | | 7/1980 | Perry | |
| 2003/0065082 | A1 | * | 4/2003 | Blanken | ............... C04B 26/006 524/492 |
| 2004/0142618 | A1 | * | 7/2004 | Porter | ..................... D03D 9/00 442/266 |
| 2008/0111267 | A1 | * | 5/2008 | Toncelli | .................. C04B 40/04 264/71 |
| 2012/0119414 | A1 | * | 5/2012 | Van Helden | .......... C04B 26/006 264/239 |
| 2014/0335325 | A1 | * | 11/2014 | Humphries | ............. B29C 70/58 428/195.1 |
| 2019/0161405 | A1 | * | 5/2019 | Huang | ...................... B32B 7/04 |
| 2019/0232524 | A1 | * | 8/2019 | Toncelli | ................. B28B 7/364 |

FOREIGN PATENT DOCUMENTS

GB    1 246 222 A    9/1971

OTHER PUBLICATIONS

International Search Report for International Application No. PCT/NL2017/050841 dated Jun. 20, 2018.

* cited by examiner

*Primary Examiner* — Kelly M Gambetta
*Assistant Examiner* — Virak Nguon
(74) *Attorney, Agent, or Firm* — Suiter Swantz pc llo

(57) ABSTRACT

The present invention relates to a method for manufacturing a slab comprising solid fillers and organic binders. More in detail the present method comprises a method for manufacturing a slab having a front layer and a rear layer, said slab comprising fillers, organic binders and additives. The present method furthermore relates to a slab obtained according to the present method.

33 Claims, No Drawings

METHOD FOR MANUFACTURING A SLAB

BACKGROUND

The present invention relates to a method for manufacturing a slab comprising solid fillers and organic binders. The present method furthermore relates to a slab obtained according to the present method.

Methods for manufacturing slabs are known from the prior art. For example, International application WO 2005/014952 (corresponding to US2006/119002) relates to a thin, i.e. a thickness of 3.5 to 6 mm, stratified, reinforced slab consisting of two outer layers and at least one resistant middle layer wherein the outer layers and the at least one middle layer consist of the same permanently hardened mix, comprising inert materials and a binding resin. The mass of the middle layer is a fibrous layer where linear elements or filaments made of glass. The mix forming outer layers and at least one middle layer is a Breton stone mix. The technology according to Breton stone envisages using a mix consisting of inert materials and a cement binder or a binder consisting of a synthetic resin with the addition of fillers, wherein the mix, which is deposited in a suitable thickness inside a forming support, preferably in the form of two rubber sheets with dimensions matching those of the final slab desired, is subjected inside a vacuum chamber to the action of a press, the ram of which is kept vibrating at a redefined frequency. After the vacuum compaction accompanied by a vibratory movement, the resulting slab is transferred to a hot hardening station where, owing to the effect of heat, the resin hardens. The slab is then freed from the rubber sheets so that it can be conveyed away for the normal finishing operations (such as sizing, polishing, etc.).

US Patent application publication 2012/119414 relates to a process for manufacturing a slab having an average thickness of about 2.5 mm to about 50 mm from a composite material, said process comprising: (a) mixing solid filler and thermoplastic binder in a kneading device at a pressure in the range of about 100 kPa to about 1500 kPa to obtain a composite material; and (b) forming the composite material into a shaped article; wherein the thermoplastic binder comprises about 60 wt. % to about 100 wt. % of a thermoplastic polyester, based on the total weight of the binder, and wherein the thermoplastic polyester comprises about 90 wt. % to about 100 wt. % of recycled polyethylene terephthalate.

US Patent application publication 2012/049413 relates to a process for manufacturing a shaped article from a composite material, said process comprising mixing solid filler and thermoplastic binder in a mixing device to obtain a composite material, forming the composite material into a shaped article; and cooling the shaped article at a cooling rate of at least about 5° C./min to about 120° C./min, wherein the weight ratio of the solid filler to the thermoplastic binder is about 2:1 to about 15:1. shaped article is a slab. The shaped article is a slab having a thickness of about 0.3 cm to about 5 cm, wherein an upper surface and a bottom surface slab are cooled simultaneously by belt cooling.

US Patent application publication US 2013/0130009 (corresponding to International application WO 2011/145928) relates to an isotropic slab of engineered stone, having a thickness of about 2 mm to about 10 mm, the slab comprising a composite material comprising about 50 to about 95 wt. % of solid filler and about 5 to about 50 wt. % of a thermoplastic binder, based on the total weight of the isotropic slab. Such a slab has been manufactured according to a process comprising the following subsequent steps: feeding solid filler and a thermoplastic binder to a mixing device, mixing the solid filler and the thermoplastic binder in the mixing device at a temperature of 230° C. to 350° C. to obtain a composite material, forming the composite material into a thin slab; and cooling the thin slab to a temperature greater than about 75° C. by belt cooling.

International application WO02/090288 relates to a process for the preparation of a composition, which comprises a matrix of solid particles, i.e. a combination of aggregate, filler and sand, embedded in a binder, wherein the binder is present in an amount in the range of from 1 to 50% by weight and comprises a synthetic thermoplastic polymer, i.e. waste or recycled polymer selected from the group of polypropylene, polyethylene terephthalate, polybutylene terephthalate and mixtures thereof, which process comprises mixing heated particles and binder, shaping if desired, and allowing the mixture to solidify, wherein solid particles and binder are heated independently of each other prior to mixing such that on mixing the temperature of the mixture is in the range of from 230 to 300° C., and wherein the solid particles are heated to a higher temperature than the binder.

US Patent application publication US 2003/122273 relates to a method of manufacturing a building product from a mix including particulate material and a binder, wherein the binder being a thermoplastic binder which binder is an asphaltenes-containing binder, which comprises heating the mix including the thermoplastic binder at least to a temperature at which the thermoplastic binder in the mix liquefies, subjecting the heated thermoplastic mix to a pressing action that shapes the heated mix, and cooling the shaped heated thermoplastic mix to solidify the thermoplastic binder and form the building product.

U.S. Pat. No. 6,177,179 relates to a process for the production of an Integral, board-like component with a visible side and a rear side which comprises the steps: filling a casting mold with a first hardenable casting mass which contains a first syrup with a first monomer and a first filler for forming the visible side layer, further filling the casting mold with a second hardenable casting mass which contains a second syrup with a second monomer and filling a second inorganic filler into the casting mold, wherein the filler forms the rear side layer together with the second casting mass, closing the casting mold, and initiating the hardening of the first and the second casting masses, beginning on the visible side of the component, wherein the first filler has a greater specific density than the syrup of the first casting mass, wherein the barrier layer is essentially impermeable for the first monomer and can be securely bonded to the visible side layer as well as the rear side layer.

From International application WO 2013/011360 is known a method for obtaining a hybrid polymer coating for petrous or ceramic substrates, the coating having a thickness between 0.1 and 2 mm and comprising a mixture of micronized powder, gravels, base resin selected from polyurethane, polyester, epoxy or acrylic and in general pigments and additives for said resin. The method comprises a step of preparing a base mixture comprising at least one first gravel of quartz, silica or silica sand in a mixer, preparing a base resin selected from polyurethane, polyester, epoxy or acrylic, adding the resin to the mentioned mixture and stirring in a mixer, creating a vacuum inside the mixer, applying a layer of the semi-fluid mixture obtained on a substrate and retaining on the same, vibrating the substrate to displace the larger gravels towards the bottom; accelerating the curing of the mixture by providing or generating heat, the mixture being consolidated on the substrate, and mechanical finishing including a mechanical polishing of the coating polymer to obtain the mentioned thickness required and a smooth surface.

Such a vibration process for causing a degree of migration of particles from one layer to another layer is also known from International application WO 2004035502. This document discloses a method of forming a particle mass comprising at least two particle populations arranged in a desired graded relationship, the method comprising: forming in a container a first layer of dry particles constituting a first particle population having a desired particle size distribution, superimposing on the first layer a second layer of dry particles constituting a second particle population having a desired particle size distribution, the second layer being in direct contact with the first layer at a contact interface, and causing the particle mass in the container to vibrate to cause a desired degree of migration of particles from one or both layers across the contact interface under the influence of force experienced by particles in the mass.

JP2006137807 relates to an epoxy resin compact obtained by impregnating epoxy resin into a fiber glass mat as reinforcing material. A mixture (250-350 weight parts) of hydrated aluminum-powder of large particle size group having particle size of 15-100 micrometer and small particle size group with particle size of less than 4 micrometer is mixed with an epoxy resin (100 weight parts) to obtain a varnish. The varnish was impregnated into a fiber glass mat and heated at 120[deg] C. for 10 minutes, to obtain a prepreg. The initial and final filler distribution is the same across the final product.

JP2005089648 relates to an insulating plate of electric switch used for motor circuits, prepared by impregnating a fiber glass mat with a mixture containing granular filler for improving arc resistance, a resin binder, and hardener for resin binder to form a prepreg and molding the formed prepreg. Such a mixture contains filler, binder and hardener, wherein the filler, i.e. aluminum hydroxide, contains particles of large size (15-100 micron) and particles of small size (less than 4 micron), in mass ratio of 10:6-10:14. The initial and final filler distribution is the same across the final product.

JPS54-37174 relates to a moulding fibre reinforced plastic material by pulverizing components, forming a slurry, applying the slurry to web, drying and moulding under heat and pressure. This document discloses the pulverization of an epoxy resin and hardener to particles smaller than 50 micrometer and the subsequent preparation of a slurry with silica powder, colloid silica and methanol. The slurry was applied to a glass fibre mat and five sheets of the web were laminated under pressure and heat to obtain a flame retardant sheet. The initial and final filler distribution is the same across the final product.

JPS54162781 relates to insulating boards for tightening rails with slabs, prepared by moulding glass fibre reinforced unsaturated polyester, quartz sand filler and additives mixture at specific temperature and pressure. The mixture as disclosed therein contains unsaturated polyester, calcium carbonate powder and quartz powder containing 99.9% of SiO2, 50% of the particles having a size of 2-10 micrometer and is impregnated into a glass mat, and moulded in a mould. The initial and final filler distribution is the same across the final product.

US Patent application publication US 2014/0335325 relates to a method for producing a unitary polymer composite article for use in highly corrosive and/or wear-resistant environments comprising: providing at least one layer of matting to a mould tool, filling to a predetermined level the mould tool with particles, infusing a resin composition into the mould tool filled with the particles and the at least one layer of matting in order to form a composite, vibrating the mould tool for a portion of time at one or more of the following stages: during the filling with the particles, after the filling with particles, during the infusing of the resin composition and after the infusion of the resin composition; wherein the composite comprises between 10% to 50% by weight of the resin composition and between 50% to 90% by weight of the particles; and curing the composite to form the moulded composite article. The unitary polymer composite article thus obtained comprises 50% to 90% by weight of silicon carbide particles and 10% to 50% by weight of resin, and at least one layer of carbon fibers matting integrally incorporated in the unitary polymer composite. The method disclosed in US 2014/0335325 starts with adding of dry particulate filler to the mould and in a subsequent step a resin pot is attached to the mould via a resin infusion line wherein the resin infusion line is opened and resin is pulled into the mould by vacuum and/or gravity. After resin infusion is completed and the infusion line is clamped, the tool is vibrated again to further densify the resin, matting and filler composite. During this densification step the resin rich zone at the top surface of the moulded article increases in thickness due to further settling of the filler.

U.S. Pat. No. 4,011,291 relates to a method of forming ceramic products containing a controlled amount of meltable binder comprising forming a mixture of a melted meltable wax binder which is solid at room temperature and ceramic forming base materials into a solid article of desired configuration by allowing said mixture to solidify in a mold, the method comprising the steps of: packing said article into a binder-absorptive material for absorbing said binder when it is converted to a liquid state wherein said binder has a melting point less than the temperature at which said base material is undesirably heat altered and wherein said binder absorptive material has a melting point greater than the melting point of the binder, is non-reactive with said binder, and has a sufficiently small particle size so as to not yield imperfections when contacting the solidified mixture and elevating and maintaining the temperature of said article above the melting point of the meltable binder but below the vaporization temperature of said binder causing said binder to become liquid and allowing said binder to be drawn from said article into said binder-absorptive material by a wicking action until at least 45% of said binder is wicked out of said article and into said binder absorptive material; and thereafter firing said article in a kiln to produce a ceramic product. According to this U.S. patent all binder (wax) is ultimately removed from the product wherein the function of the binder is to shape the article in (intricate) forms. The binder does not function as a glue but the glueing is achieved by sintering/firing at very high temperature. In addition, the adsorption of binder is achieved by wicking in an oven, not by applying any external force, wherein the article obtains its final shape before adsorption/wicking. European patent EP 0 032 403 relates to a method of producing an article from a fired particulate configuration whereby binder material is removed from the particulate configuration prior to firing without swelling the particulate configuration and consequent imparting of sheer or tensile force to the particulate configuration prior to the firing thereof, comprising the steps of: mixing together predetermined amounts of sinterable particulate material and a binder whereby the binder covers substantially all of the surface of the particles of said particulate material, forming said mixture into a desired configuration, placing a small selected area of said configuration in intimate contact with an absorbing body capable of absorbing said binder that is wetted by said binder, whereby a minimum of forces is directed into said configuration by said absorbing body, allowing said binder to flow from said configuration into said absorbing body to extract at least a predetermined portion of said binder from said configuration, and sintering said stripped and formed configuration. The capillary forces give rise to a pressure need which is the driving force behind the binder removal.

U.S. Pat. No. 5,445,788 relates to a method of separating at least partly a wax binder from a mixture thereof with a powder or a plurality of powders, wherein the particulate material is alumina, the method comprising: molding the mixture into an element having a desired shape, surrounding the molded element with a contiguous layer of a particulate material which can absorb the binder, subjecting the molded element to an isostatic pressure through the surrounding particulate material layer in conditions sufficient to effect the absorption of at least a part of the wax binder by the particulate material, and separating the surrounding layer from the molded element. The action of the isostatic pressure augments the capillary action of the alumina powder surrounding the composite part to effect the transfer of a substantial amount of the binder from the composite cast part to the surrounding alumina layer which acts as an absorbent.

JPH09188568 relates to a method for forming a powder or the powder comprises combining absorption defatting by a fiber absorbing body with defatting due to decomposition and mixing non-plastic powder of an inorganic substance, a metal, etc., with low-melting wax and the heating the mixture and defoaming the mixture under vacuum as slurry and then, casting and solidifying the mixture and bringing the resultant formed article into contact with the fiber absorbing body while carrying out temperature control and making a part of wax absorbed into the absorbing body to afford a prescribed wax amount and then, carrying out defatting due to decomposition and sintering the mixture.

U.S. Pat. No. 4,704,242 relates to a method of injection molding high density silicon nitride articles having large cross sections, comprising steps of: compounding a ceramic powder with a binder to form a blend, injection molding the product from step to form a molded ceramic, embedding the product in a setter bed containing a setter powder to form a binder retarding layer of said setter powder on said molded ceramic article, heating the product in a non-oxidizing, retarding the removal of said binder from said molded ceramic article, increasing the temperature in a non-oxidizing environment to allow breakdown of the binder retarding layer and allow binder vaporization, increasing the temperature and maintaining the product in air for a period sufficient to completely remove said binder from said molded ceramic article, cooling the product to room temperature to obtain an externally crack-free injection molded and binder free ceramic article having a cross section greater than one centimeter.

On basis of the above discussion of relevant prior art one must realize that nowadays a wide range of polymer-filler composite products is used in the construction of buildings, cars, aviation etc. These products are manufactured with different technologies that can basically be divided into two categories, namely i) chemical processes employing a liquid thermoset resin that solidifies via chemical reaction (like two component adhesives) and ii) mechanical processes using a thermoplastic resin at high temperature, that subsequently solidifies by cooling.

In the technical area of artificial (or engineered) stone products for the building industry require very high levels of fillers, e.g. up to 90% by weight, to mimic the stone like features of natural stone products. A very important technical challenge is how to effectively mix such very highly filled polymer-mineral composites, while at the same time keeping the wear of the mixing devices at an acceptable level.

As discussed above, some processes employ thermoset resins in very low contents below 10%, mainly in a batch process. The batch mixers are designed in such a way that they can cope with the high shear and wear created by the very abrasive quartz/resin mix. The batch vacuum vibration presses are dimensioned such a way that they are able to press out all air and create a non-porous product. However, such a batch process is capital intensive, generates industrial waste; uses (toxic) chemicals and limits plant productivity and the flexibility of product dimensions. The slab produced according to these batch processes has generally a minimum thickness of typically 10 mm (due to process constraints and mechanical properties) and the length of the slabs cannot be tailor made. The length of the slab will always be the same from batch to batch due to the dimensions of the batch press. In addition, a lot of waste in the down-stream cut process will be generated since most of the final applications do not have the same dimensions as the dimensions of the batch press.

It has also been attempted to use thermoplastic or thermoset resins in a continuous (mechanical) process. Such a technology would need less capital investment having higher productivity and would lead to a reduction of waste, avoidance of toxic chemicals and increase of flexibility in product dimensions. However, such attempts have proven to be unsuccessful, because machine wear is too high when high concentration of hard coarse minerals are used for manufacturing high quality end products and degassing the end product to a final product free of air pores has shown to be unviable at such low binder content in a continuous process. This could be overcome by using a higher binder content in the mixing unit, but in order to reduce significantly the wear in the mixing unit the binder content has to be increased to at least 25% or higher (30%). At those high binder contents the hardness of the final product decreases significantly and the final product does not have the appearance of a stone like material which will be an important barrier for the selling argument of these materials.

BRIEF SUMMARY

An aspect of the present invention is to provide a method for manufacturing a slab wherein one or more of the shortcomings of the cited art as discussed above are overcome.

More in detail, an aspect of the present invention is to provide a method for manufacturing a slab wherein a slab having excellent product properties is obtained.

The present invention relates thus to a method for manufacturing a slab comprising solid fillers and organic binders, said method comprises the following steps:

i) providing a mixture comprising organic binders and solid fillers, wherein said solid fillers comprise fine particles and coarse particles;

ii) providing a substrate layer having an organic binder absorption capacity;

iii) contacting the mixture of step i) with the substrate layer of step ii);

iv) exerting a force on the composite obtained in step iii) for migrating at least a part of said organic binder into said substrate layer;

v) cooling the construction obtained in step iv);

vi) removing said substrate layer from the construction obtained in step v) for obtaining the slab.

DETAILED DESCRIPTION

The present inventors found that by using such a method for manufacturing a slab one or more of the above identified aspects can be achieved. According to the present method the composition of the mixture in step i) has a significantly higher organic binder content than desired in the final product, i.e. the slab. This high organic binder content in the mixture in step i) will have a positive influence on the reduction of wear in the mixing equipment, and the substrate layer as used in step ii) will function as a kind of sponge for absorbing at least a part of the organic binder that was originally present in the starting mixture of step i).

During step iv), wherein a force is exerted on the mixture comprising organic binders and solid fillers, a migration of at least a part of the organic binder into the substrate layer will take place. The force exerted here is an external force. Without such an external force there will be no migration of at least a part of the organic binder into the substrate layer. The force applied here is a force substantially perpendicular on the substrate layer. An example of such a force is a pressure roll, a combination of rotating rolls wherein the pressure is exerted on the feed material positioned between these rotating rolls. The present inventors found that for a continue process the pressure is in a range of 5-50 bar, preferably in a range of 10-40 bar. In addition, the present inventors found that in step iv) static laboratory results revealed a pressure of about 5-20 bar during a period of about 0.5 minutes-5 min, especially 1-3 minutes. A pressure below the afore mentioned range does not result in an acceptable level of migration of the organic binder into the substrate layer. A pressure above the afore mentioned level is from an economical reason not beneficial. In an embodiment of a continuous process the conveyor speed is about 0.5-5 m/s, especially about 1-2.5 m/s. In the present invention the force applied according to step iv) is not of the vacuum type. The force applied according to step iv) in the present invention is not of the infusion type as applied in US Patent application publication US 2014/0335325.

Due to the migration the concentration of the coarse particles in the mixture comprising organic binders and solid fillers will increase. Since the solid fillers comprise both fine particles and coarse particles some parts of the fine particles will also migrate into the substrate layer. The organic binder absorption capacity of the substrate layer is chosen such that the coarse particles will not migrate into the substrate layer and that consequently the coarse particles are concentrated adjacent to the substrate layer. In other words, the substrate layer will form a barrier for the coarse particles to migrate into the substrate layer. The concentration of those coarse particles at the interface between the starting mixture comprising organic binders and solid fillers and the substrate layer will have a beneficial effect on the mechanical properties of the final slab. This enrichment of coarse particles will result in an increase of the surface hardness of the final slab, especially at the side where this enrichment is present. According to step vi) the substrate layer will be removed from the construction obtained in step v). This step of removing the substrate layer will release a surface layer of the thus hardened mixture of organic binders and solid fillers. Since the coarse particles did not migrate into the substrate layer, which substrate layer now has been removed, the coarse particles are located adjacent to the surface layer. The step of removing the substrate layer preferably includes the removal of a small layer of the outermost layer of the hardened mixture of organic binders and solid fillers thereby further increasing the concentration of the coarse particles at that outermost layer. The effect is that the hardness of such a product, i.e. the slab, will be high. The slab as such does not comprise the substrate layer as used in step ii) of the present method any more. Thus, the substrate layer is to be understood as a sacrificial layer in the present method since the substrate layer is an essential technical feature of the present method but the substrate layer will not form a part of the final slab.

In step i) wherein a mixture comprising organic binders and solid fillers is provided, wherein said solid fillers comprise fine particles and coarse particles, the mixture can be identified as a wet mixture. The wet mixture is a homogenous mixture, i.e. a mixture wherein all individual components are mixed together. Such a homogenous mixture can be obtained by mixing all starting materials in one kneading apparatus, wherein such an apparatus may comprise different zones for feeding the individual starting materials. The outlet of such an apparatus thus provides the homogenous mixture comprising organic binders and solid fillers, wherein said solid fillers comprise fine particles and coarse particles. Such a situation is completely different from US Patent application publication US 2014/0335325 wherein in a first step dry particulate filler is added to the mould and in a subsequent step a resin pot is attached to the mould via a resin infusion line wherein the resin infusion line is opened and resin is pulled into the mould by vacuum and/or gravity.

In an embodiment of the present method step iv) is carried out in such a way that the concentration of coarse particles in the starting mixture of step i) is lower than the concentration of coarse particles in the mixture after step iv).

In an embodiment of the present method at least a part of said fine particles migrates into said substrate layer according to step iv).

In an embodiment of the present method step iv) is carried out in such a way that the coarse particles are concentrated adjacent to the substrate layer.

The present method will thus result in a change in particles distribution during the manufacturing process, i.e. the formation of a particles concentration profile across the thickness of the final slab after the manufacturing process. The present method thus relates to a selective migration of at least a part of the organic binder and particles from the initial mixture into the substrate layer, i.e. at least a part of the organic binder and fine particles migrate into the substrate layer, while the coarse particles are retained in the initial mixture. In practice some parts of the organic binder and fine particles will remain in the starting mixture and thus this organic binder will function as a "matrix" for coarse particles.

Examples of materials for the substrate layer are materials chosen from the group of paper, cardboard, textile fibres, glass fibre mat, natural fibre mat, such as flax fibers, Abaca fibers, coir fibers, hemp fibers, jute fibers, carbon fibers and basalt fibers, or a combination thereof. These materials enable the "sponge" function of the substrate layer, i.e. the absorption of at least a part of the organic binder during present step iv). Furthermore, the substrate layer may function as a kind of a support layer in the method for manufacturing a slab comprising solid fillers and organic binders. In that context the substrate layer may be provided with the mixture comprising organic binders and solid fillers thereby functioning as a support for that mixture during present step iv). As mentioned in step vi) above, the substrate layer will be removed from the construction obtained in step v) and will thus form no part of the final slab. The present substrate layer has an organic binder absorption capacity preferably in a range of 100-3000 g/m$^2$, more preferably 500-3000 g/m$^2$, even more preferably 1000-3000 g/m$^2$. Although the term "substrate layer" has been used here, such a substrate layer may comprise several sub layers.

The number and the size of voids in the substrate layer is such that during step iv) the coarse particles will not migrate into the substrate layer. The number and the size of voids of the substrate layer is chosen such that the substrate layer will function as a selective filter or membrane wherein only specific components of the starting mixture according to step i), e.g. fine particles and organic binder, having a size smaller than the voids present in the substrate layer can migrate into the interstices or voids of the substrate layer. The result of such a selective filtering or absorbing property of the substrate layer is that specific components of the starting mixture having a size bigger than the interstices or voids of the substrate layer will remain in the originally provided mixture according to step i).

The substrate layer in step ii) is preferably in the form of a mat.

As mentioned above in step vi) the substrate layer will be removed from the construction obtained in step v). Such a step will not only remove the substrate layer but a part of the hardened layer directly located beneath the substrate as well. The removal of these layers will result in an exposure of a layer of hardened material, that layer being composed of coarse particles. The hardness of that layer is crucial for the use of the slab in specific applications. Examples of such a removal step vi) comprise one or more of milling, planing, sanding, sawing, polishing, etching and abrasion, or a combination thereof. According to an embodiment of the present method the thickness of the layer to be removed in step vi) is about 0.1-1.0 mm, preferably in a range of 0.2-0.5 mm. The aforementioned ranges are based on the hardened material only, i.e. without the thickness of the substrate layer.

In another embodiment of the present method step iii) further comprises positioning the mixture of step i) between two substrate layers. These substrate layers may be of the same type or of a different type of material. Such a sandwich construction will minimize the occurrence of warpage. In an embodiment wherein two substrate layers have been applied, step vi) may further comprise the removal of both substrate layers. For such an additional substrate layer the material is chosen from the group of paper, cardboard, textile fibres, glass fibre mat, natural fibre mat, such as flax fibers, Abaca fibers, coir fibers, hemp fibers, jute fibers, carbon fibers and basalt fibers, or a combination thereof.

In the present method the organic binder is preferably chosen from the group of thermoset and thermoplast type binders, or a combination thereof.

In case of the application of thermoset type binders in step i) the present method may further comprise a step of heating during one or more of step i), step ii), step iii) and step iv). Thus, in an embodiment the present method for manufacturing a slab comprises a step of heating the mixture of step i) before step iv) is carried out, wherein the heating takes place at a temperature of 100-160° C. in case of a thermoset type organic binder and at a temperature above the melting point Tm in case of a thermoplast type organic binder. Such a step of heating is preferred for facilitating present step iv), i.e. the migration of at least a part of the organic binder into the substrate layer. In other words, in the present method step iv) is carried out under high temperature conditions in case of thermoplastic resin binder and in case of thermoset resin the step iv) of migration can be done under ambient temperature followed by high temperature curing.

Present step i) may further comprise mixing organic binders, additives and fillers at an elevated temperature.

In a preferred embodiment step iii) further comprises applying the mixture comprising organic binders and solid fillers on a support in a continuous mode and applying the substrate layer on top of said mixture laying on the support. In another embodiment step iii) further comprises applying the mixture comprising organic binders and fillers on a substrate layer in a continuous mode and applying another substrate layer on top of said mixture laying on said support thereby positioning said mixture between substrate layers.

In another preferred embodiment step iii) further comprises applying the substrate layer on a support in a continuous mode and applying the mixture comprising organic binders and solid fillers on top of the substrate layer laying on the support. In another embodiment step iii) further comprises applying said substrate layer on a support in a continuous mode and applying said mixture comprising organic binders and fillers on top of said substrate layer laying on said support and applying another substrate layer on top of said mixture thereby positioning said mixture between substrate layers.

An example of such a support is an endless conveyor belt.

For obtaining a high pressure in a continuous mode of the present method step iv) further comprises transferring the support, the support comprising the substrate layer(s) and the mixture comprising organic binders and fillers through a slit between rotating rolls. By adjusting the width of the slit between the rotating rolls both the pressure exerted on the feed material and the thickness of pressed feed material can be set at a desired range.

The present inventors found that the presence of air bubbles in the binder containing mixture will have a negative influence on the final mechanical properties of the final slab. It is thus preferred to further include in step i) a step of de-aeration, preferably during or after mixing said organic binders, additives and fillers. Such a step of de-aeration can be carried out by vibrating the mixture with an under pressure, i.e. vacuum conditions in the mixing unit and or the press. Such a step of de-aeration may also comprise the application of an under pressure without vibration.

The particle size distribution of the fine particles in the mixture of step i) is preferably chosen from a range below 63 micron.

According to another preferred embodiment the particle size distribution of the first amount of coarse particles is chosen from a range of 63-1200 micron, especially 100-800 micron. This particle size distribution of coarse particles will be chosen such that the final volume fraction of coarse minerals in the front layer is very high (>0.75) yielding high product hardness.

The thickness of the slab obtained after step vi) is in a range of 2 to 10 mm.

According to a preferred embodiment the weight percentage of organic binder is in a range of 5-40 wt. %, the weight percentage of solid fillers is in a range of 50 to 95 wt. %, the weight percentage of additives is in a range of 0.1-10 wt. %, all weight percentages being based on the total weight of the slab obtained after step vi).

According to another preferred embodiment organic binder comprises 60-100 wt. % of thermoplastic polyester and 0-40 wt. % of a polyolefin, based on the total weight of the organic binder.

It is preferred that 90-100 wt. % of said thermoplastic polyester is one or more chosen from the group of polybutylene terephthalates, modified polyethylene terephthalates, recycled polyethylene furanoate, polycarbonates, polylactates and recycled polyethylene terephthalates, based on the total weight of the thermoplastic polyester.

The organic binder is preferably a thermoset type binder chosen from the group of unsaturated polyester resin, acrylic resin, epoxy resin or phenolic resin, or a combination thereof.

Examples of the coarse particles are chosen from the group of inorganic minerals, such as quartz, glass, silica sand ($SiO_2$), calcium carbonates, such as marble ($CaCO_3$) or dolomite ($CaMg(CO_3)_2$), aluminum tri-hydrate (ATH), wollastonite ($CaSiO_3$), coesite, cristobalite, keatite, moganite, seifertite, stishovite and tridymite, especially inorganic minerals having a Mohs hardness of at least 7.

In a preferred embodiment of the present slab the concentration profile of the fine particles shows a gradient over the thickness of said slab, wherein the concentration of said fine particles in said front layer of the slab is lower than in said rear layer of the slab.

In a slab according to the present invention the particle size distribution of the coarse particles is chosen from a range of 63-1200 micron, especially 100-800 micron.

The present slab is further characterized in that the Barcol Hardness as measured on the front layer of said slab exceeds a value of 65, preferably 75, in case of an organic thermoset type binder (according to ASTM D 2583-07 "Standard Test Method for Indentation Hardness of Rigid Plastics by Means of a Barcol Impressor").

The present slab is further characterized in that the Barcol Hardness as measured on the front layer of said slab exceeds a value of 55, preferably 70, in case of an organic thermoplast type binder (according to ASTM D 2583-07 "Standard Test Method for Indentation Hardness of Rigid Plastics by Means of a Barcol Impressor").

Various aspects of the present invention are now illustrated by way of examples and comparative examples.

TABLE 1

Test results

| | Resin level, % wt | Fines Type, (psd < 63 micron) | Fines level, % wt | Coarse type | Coarse psd, micron | Coarse level, % wt | Top Barcol Hardnes | Bottom Barcol Hardness |
|---|---|---|---|---|---|---|---|---|
| IPQ 196-16 | 23 | Cristobalite | 26 | Cristobalite | <400 | 52 | 66 | 41 |
| IPQ 197-16 | 23 | Cristobalite | 26 | Cristobalite | <400 | 52 | 59 | 41 |
| IPQ 198-16 | 23 | Cristobalite | 26 | Cristobalite | <400 | 52 | 62 | 46 |
| IPQ 199-16 | 25 | Quartz | 19 | Quartz | <500 | 56 | 65 | 57 |
| IPQ 200-16 | 25 | Quartz | 19 | Quartz | <500 | 56 | 66 | 55 |
| KPQ 285 | 30 | Cristobalite | 23 | Cristobalite | <400 | 47 | 41 | 40 |
| KPQ 315 | 30 | Cristobalite | 23 | Cristobalite | <400 | 47 | 46 | 40 |

TABLE 2

Test results

| | Resin level, % wt | Fines Type, (psd < 63 micron) | Fines level, % wt | Coarse type | Coarse psd, micron | Coarse level, % wt | Barcol Hardness (SAL after polishing) | Reference Sample No SALayer |
|---|---|---|---|---|---|---|---|---|
| IBQ 212-16 | 20 | Quartz | 27 | Quartz | <500 | 53 | 74 | 67 |
| IBQ 214-16 | 17 | Quartz | 23 | Quartz | <1200 | 60 | 75 | 65 |
| IBQ 215-16 | 17 | Quartz | 23 | Quartz | <1200 | 60 | 75 | 65 |
| IBQ 216-16 | 20 | Quartz | 27 | Quartz | <500 | 53 | 73 | 67 |
| IBQ 217-16 | 20 | Quartz | 27 | Quartz | <500 | 53 | 76 | 67 |
| IBQ 218-16 | 20 | Quartz | 27 | Quartz | <500 | 53 | 75 | 67 |
| IBQ 220-16 | 18 | Quartz | 23 | Quartz | <1200 | 59 | 78 | 66 |
| IBQ 221-16 | 18 | Quartz | 23 | Quartz | <1200 | 59 | 72 | 66 |

The present method is preferably carried out as a continuous process, i.e. steps i)-v) are carried out in a continuous mode.

The present invention furthermore relates to a slab obtainable according to the present method as discussed above, such a slab consisting of a front layer and a rear layer, wherein the concentration profile of coarse particles shows a gradient over the thickness of said slab, wherein the concentration of said coarse particles in said front layer of the slab is higher than in said rear layer of the slab, wherein said front layer is the layer that has been released after removal of said substrate layer from the construction obtained in step v).

Table 1 relates to thermoplast type resins, Table 2 to thermoset type resins.

The first column of Table 1 refers to the sample number, the second column to the amount of resin, the third column to the type of fine particles, the fourth column to the amount of fines in the starting mixture according to step i), the fifth column to the type of coarse particles, the sixth column to the particle size of the coarse particles, the seventh column to the amount of coarse particles in the starting mixture according to step i), the eight column to the Barcol hardness measured on the front layer of the slab and the last column to the Barcol hardness on the rear layer of the slab.

Table 2 is somewhat similar to Table 1, except for the last two columns. Column 8 of Table 2 refers to the Barcol hardness measured on a sample wherein the initially present substrate layer has been removed from the construction. Column 9 of Table 2 refers to the Barcol hardness measured on a reference sample, i.e. a sample having the same composition but without the application of any substrate layer. Thus the reference samples are samples not according to the present method.

In the experiments shown in Table 1 the substrate layer is a paper layer having an organic binder absorption capacity of 200 g/m$^2$. The type of resin in Table 1 is rPET, i.e. recycled PET. Sample KPQ 285 is an embodiment not according to the invention since the substrate layer used here is a paper layer having an organic binder absorption capacity less than 100 g/m$^2$.

In the experiments shown in Table 2 the resin is a BIO based ELO/MHHPA resin (Epoxidized Linseed Oil/methyl-hexahydrophthalic anhydride) cured by a DABCO (1,4-Diazabicyclo[2.2.2]octane) type catalyst. These experiments all show a high Barcol hardness. The substrate layer used for all experiments is a paper layer having an organic binder absorption capacity of 700 g/m$^2$.

The experiments shown in Table 1 clearly indicate a Barcol hardness for the front layer of the slab, i.e. the side of the slab where the substrate layer has been removed according to step vi), that is substantially higher than the Barcol hardness measured for the rear layer of the slab, i.e. the side of the slab where no substrate layer has been applied. In Table 2 the Barcol hardness values for experiments with a removal of the substrate layer (see the column indicated as "SAL after polishing") are significantly higher than experiments manufactured with the same composition but without the application of any substrate layer. This comparison shows the effect of the application of a substrate layer (and the removal thereof) in the present method for manufacturing a slab. These results provide a clear evidence that the present method results in an increase of the concentration of coarse particles in a specific location of the final slab, i.e. the rear layer, namely the layer that has been stripped of from the substrate layer.

The invention claimed is:

1. A method for manufacturing a slab comprising solid fillers and organic binders, said method comprises the following steps:
   i) providing a mixture comprising organic binder and solid fillers, wherein said solid fillers comprise first particles and second particles, wherein the second particles are coarser than the first particles;
   ii) providing a substrate layer having an organic binder absorption capacity;
   iii) contacting the mixture of step i) with the substrate layer of step ii);
   iv) exerting a force on the composite obtained in step iii) for migrating at least a part of said organic binder into said substrate layer;
   v) cooling the construction obtained in step iv); and
   vi) removing said substrate layer from the construction obtained in step v) for obtaining the slab;
   wherein the mixture of step i) is heated before step iv) is performed.

2. A method according to claim 1, wherein in step iv) at least part of the first particles are migrated into the substrate layer such that the concentration of the second particles in the starting mixture of step i) is lower than the concentration of the second particles in the mixture after step iv).

3. A method according to claim 1, wherein in step iv) at least a part of said first particles migrates into said substrate layer.

4. A method according to claim 1, wherein in step iv) the first particles adjacent the substrate layer are migrated into the substrate layer such that the second particles are concentrated adjacent to the substrate layer, and wherein a pore size of the substrate layer is smaller than a particle size of the second particles such that the second particles do not migrate into the substrate layer.

5. A method according to claim 1, wherein said substrate layer has an organic binder absorption capacity in a range of 100-3000 g/m$^2$.

6. A method according to claim 5, wherein said substrate layer is made of a material chosen from the group of paper, cardboard, textile fibres, glass fibre mat, natural fibre mat, such as flax fibers, Abaca fibers, coir fibers, hemp fibers, jute fibers, carbon fibers and basalt fibers, or a combination thereof.

7. A method according to claim 1, wherein said substrate layer is a porous layer having pores with a size in a range of 10-100 microns.

8. A method according to claim 1, wherein step iii) further comprises positioning the mixture of step i) between two substrate layers of step ii), wherein these two substrate layers are of the same type or of a different type of material.

9. A method according to claim 8, wherein step vi) further comprises the removal of both substrate layers.

10. A method according to claim 1, wherein step vi) comprises one or more of milling, planing, sanding, sawing, polishing, etching and abrasion, or a combination thereof.

11. A method according to claim 1, wherein said mixture in step i) further comprises one or more additives chosen from the group of glass fibers, flax fibers, Abaca fibers, coir fibers, hemp fibers, jute fibers, carbon fibers and basalt fibers, or a combination thereof.

12. A method according to claim 11, wherein the weight percentage of organic binder is in a range of 5-40 wt. %, the weight percentage of solid fillers is in a range of 50 to 95 wt. %, the weight percentage of additives is in a range of 0.1-10 wt. %, all weight percentages being based on the total weight of the slab obtained after step vi).

13. A method according to claim 12, wherein said organic binder is a thermoset type binder chosen from the group of unsaturated polyester resin, acrylic resin, epoxy resin or phenolic resin, or a combination thereof.

14. A method according to claim 1, wherein said organic binder is chosen from the group of thermoset and thermoplast type binders, or a combination thereof.

15. A method according to claim 14, wherein said heating takes place at a temperature above of 100-160° C. for the thermoset type binders and above the melting point Tm of the thermoplast type binders.

16. A method according to claim 1, wherein step iii) further comprises applying said mixture comprising organic binders and fillers on a support in a continuous mode and applying said substrate layer on top of said mixture laying on said support, or step iii) further comprises applying said mixture comprising organic binders and fillers on a substrate layer in a continuous mode and applying another substrate layer on top of said mixture laying on said support thereby positioning said mixture between substrate layers.

17. A method according to claim 16, wherein step iv) further comprises transferring said support through a slit between rotating rolls, wherein the conveyor speed of said support is in a range of about 0.5-5 m/s.

18. A method according to claim 1, wherein step iii) further comprises applying said substrate layer on a support in a continuous mode and applying said mixture comprising organic binders and fillers on top of said substrate layer laying on said support, or step iii) further comprises applying said substrate layer on a support in a continuous mode and applying said mixture comprising organic binders and fillers on top of said substrate layer laying on said support and applying another substrate layer on top of said mixture thereby positioning said mixture between substrate layers.

19. A method according to claim 1, wherein step i) further comprises a step of de-aeration after mixing said organic binders and fillers.

20. A method according to claim 1, wherein the particle size distribution of the first particles is chosen from a range below 63 micron.

21. A method according to claim 1, wherein the particle size distribution of the second particles is chosen from a range of 63-1200 micron.

22. A method according to claim 1, wherein the thickness of the slab obtained after step vi) is in a range of 2 to 10 mm.

23. A method according to claim 1, wherein said organic binder comprises 60-100 wt. % of thermoplastic polyester and 0-40 wt. % of a polyolefin, based on the total weight of the organic binder.

24. A method according to claim 23, wherein 90-100 wt. % of said thermoplastic polyester is one or more chosen from the group of polybutylene terephthalates, modified polyethylene terephthalates, recycled polyethylene furanoate, polycarbonates, polylactates and recycled polyethylene terephthalates, based on the total weight of the thermoplastic polyester.

25. A method according to claim 1, wherein said coarse particles are chosen from the group of inorganic minerals including quartz, glass, silica sand ($SiO_2$), calcium carbonates, marble ($CaCO_3$) or dolomite ($CaMg(CO_3)_2$), aluminum tri-hydrate (ATH), wollastonite ($CaSiO_3$), coesite, cristobalite, keatite, moganite, seifertite, stishovite and tridymite, and inorganic minerals having a Mohs hardness of at least 7.

26. A method according to claim 1, wherein steps i)-v) are carried out in a continuous mode.

27. A method according to claim 1, wherein the force according to step iv) is applied as pressure in a range of 5-50 bar.

28. A method according to claim 1, wherein the force according to step iv) is applied as pressure in a range of about 5-20 bar, during a period of about 0.5 minutes-5 min.

29. A slab consisting of a front layer and a rear layer and obtained according to the method as disclosed in claim 1, wherein the concentration profile of the second particles shows a gradient over the thickness of said slab, wherein the concentration of said second particles in said front layer of the slab is higher than in said rear layer of the slab, wherein said front layer is the layer that has been released after removal of said substrate layer from the construction obtained in step v).

30. A slab according to claim 29, wherein the concentration profile of the first particles shows a gradient over the thickness of said slab, wherein the concentration of said first particles in said front layer of the slab is lower than in said rear layer of the slab.

31. A slab according to claim 29, wherein the particle size distribution of the second particles is chosen from a range of 200-1200 micron.

32. A slab according to claim 29, wherein the Barcol Hardness as measured on the front layer of said slab exceeds a value of 65 in case of an organic thermoset type binder (according to ASTM D 2583-07 "Standard Test Method for Indentation Hardness of Rigid Plastics by Means of a Barcol Impressor").

33. A slab according to claim 29, wherein the Barcol Hardness as measured on the front layer of said slab exceeds a value of 55 in case of an organic thermoplast type binder (according to ASTM D 2583-07 "Standard Test Method for Indentation Hardness of Rigid Plastics by Means of a Barcol Impressor").

* * * * *